United States Patent [19]

Hardwick

[11] Patent Number: 4,769,524

[45] Date of Patent: Sep. 6, 1988

[54] PLASMA ELECTRODE

[76] Inventor: Steven F. Hardwick, P.O. Box 31415, Charleston, S.C. 29417-1415

[21] Appl. No.: 111,865

[22] Filed: Oct. 23, 1987

[51] Int. Cl.[4] .............................................. B23K 9/00
[52] U.S. Cl. .................... 219/121.52; 219/75; 219/121.48; 219/121.53; 219/121.36
[58] Field of Search ................. 219/121 PR, 119, 118, 219/121 PS, 121 PM, 121 PP, 121 P, 74, 75, 76.16; 313/231.31, 231.41, 231.51

[56] References Cited

U.S. PATENT DOCUMENTS

| | | | |
|---|---|---|---|
| 3,690,567 | 9/1972 | Borneman | 219/121 PR |
| 3,740,522 | 6/1973 | Muehlberger | 219/121 PR |
| 3,894,573 | 7/1975 | Paton et al. | 219/121 PR |
| 3,930,139 | 12/1975 | Bykhovsky et al. | 219/121 PR |

*Primary Examiner*—M. H. Paschall
*Attorney, Agent, or Firm*—B. Craig Killough

[57] ABSTRACT

Disclosed herein is an electrode which may be used in plasma cutting torches which has a superior service life over similar electrodes found in the prior art, due to a design which improves cooling of the electrode, and which allows advancement and resurfacing of the electrode insert.

3 Claims, 1 Drawing Sheet

2

PLASMA ELECTRODE

BACKGROUND AND SUMMARY OF THE INVENTION

This invention relates generally to plasma cutting torches, and is more specifically directed to an electrode for plasma cutting torches that has a superior service life.

Plasma cutting torches incorporate electrodes which generate a plasma arc which is used for the cutting of metals or other materials. Plasma cutting torches are widely found and used in the prior art. Electrodes currently found in the prior art are characterized by a conductive casing, which is normally copper, which encompasses the electrode insert. This insert is generally concentric with the casing, but of smaller diameter, and is generally made of hafnium, zirconium, or tungsten. This insert is fixed by a friction fit within the casing, and is not designed to be moveable, removeable, or replaceable.

In use, the insert erodes so as to form a crater in the electrode insert. When the crater depth in the electrode reaches approximately 0.050 to 0.060 inches, the performance of the electrode depreciates to a level which makes it unusable. Since, in the prior art, the insert is fixed within the conductive casing, the entire electrode is discarded. Under normal cutting conditions, electrodes must be replaced after two hours of use for hafnium or zirconium inserts when used with air or oxygen as the plasma forming gas. Accordingly, the expense associated with the electrodes found in the prior art is high.

SUMMARY OF THE PRESENT INVENTION

The present invention provides a plasma arc electrode which has a greatly superior service life. The design of the casing of the present invention provides superior cooling for the insert, and the insert in the present invention may be advanced as it is used, so as to extend the life of the electrode.

In the present invention, when the electrode is new, the insert extends well into the casing. A cavity is provided which allows air flow around the insert to increase cooling of the insert and the electrode so as to extend the life of the insert and the electrode. Once the electrode has eroded to an unusable point, the insert may be advanced through the casing, and the portion of the electrode in which a crater has been formed may be removed by, for example, grinding away that portion of the insert. The electrode has now been renewed, and this procedure may be followed until there is insufficient useable insert material remaining.

DETAILED DESCRIPTION OF THE PREFERRED EMBODIMENT

The present invention is a plasma arc electrode which extends the useable life of the electrode over those electrodes currently found in the prior art. The improved service life of the present invention results from increased cooling due to the design of the casing of the electrode, and due to the fact that the insert may be advanced through the casing, with the worn portion of the insert removed so as to provide an electrode which may be renewed and reused.

The present invention comprises a casing 2 having a void therein in which an insert 4 is held by friction means. In the preferred embodiment, and generally in the prior art, this casing is largely cylindrical, although it may have steps 6 of greater outside diameter which aid in retaining the electrode within the plasma cutting torch 8.

A void is formed within the casing, and the insert 4 is retained within the void by friction at the annular contact area between the insert 4 and the casing 2. The insert 4 extends to and is flush with the lower exterior surface 10 of the casing 2.

Figure 2:
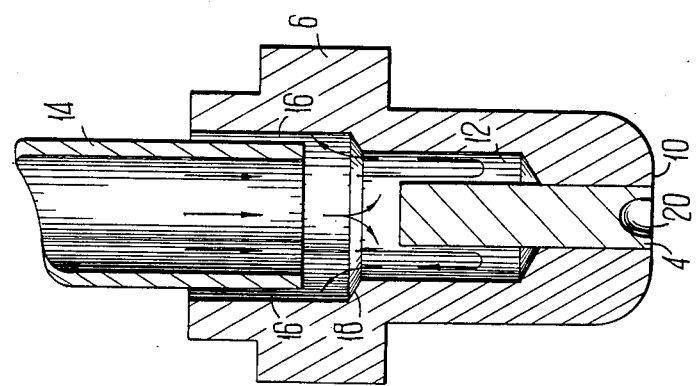
FIG. 2 is a sectioned side elevation of the invention, with arrows showing the travel of the plasma forming gas.
Figure 1:
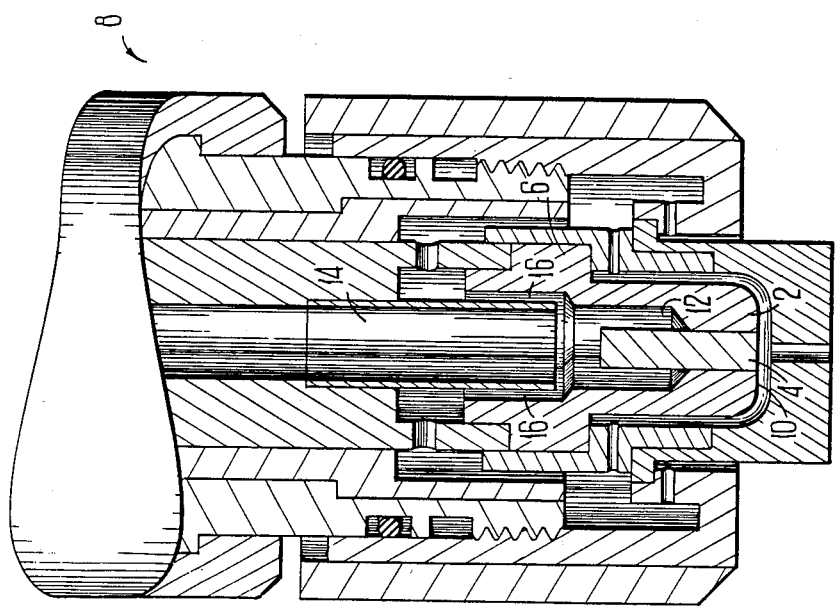
FIG. 1 is a partial, sectioned side elevation of a plasma cutting torch showing the mounting of the electrode within the torch.

In the preferred embodiment of the present invention, a second void, or cavity 12, is formed within the casing 2. This cavity 12 is above the external surface of the casing 2 with which the insert 4 is flush, and for the purpose of this disclosure, will be defined to be above the smaller void in which the insert 4 is retained by frictional contact. When the electrode is unused, the insert 4 will extend well into the cavity 12 toward the torch 8. A tube 14 which is a part of the plasma torch 8 provides a gas flow which enters the cavity 12. This gas flows over the insert 4, reaching the bottom of the cavity 12, and then the gas turns 180 degrees and exits in the annular area 16 formed by the cavity 12 and the outside diameter of the tube 14. FIG. 2. This air flow through the cavity 12 and about the insert 4 provides superior cooling of the insert, increasing the usable life of the insert and the electrode. As specifically shown in FIG. 2, the cavity may have a step 18 to provide an even larger diameter of the cavity near the point where the electrode mounts to the torch, if needed to provide sufficient gas flow.

In use, the insert will form a crater 20 in its surface from the production of the plasma arc. When the erosion of this crater reaches a certain depth, which is usually about 0.050 to 0.060 inches, the electrode becomes unusable. In the prior art, electrodes are disposed of when this situation arises. The rate at which this erosion occurs will be governed by gas flow, amperage, cooling, arc ignitions and power source starting characteristics. However, under normal cutting conditions, a hafnium or zirconium insert, the type most commonly used, will last approximately two hours when used with air or oxygen as the plasma forming gas.

Figure 3:
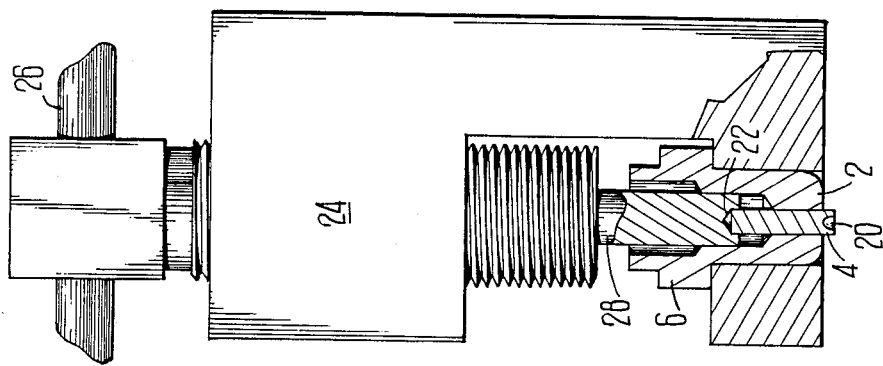
FIG. 3 is a partially sectioned side elevation showing a tool which may be used to advance the insert through the electrode.

In the present invention, after a crater 20 has formed of sufficient depth so as to require servicing of the electrode, the electrode may be removed from the torch and advanced through the casing, with the worn portion of the insert removed so that the insert is again flush with the exterior surface of the casing. The insert, which is longer than inserts found in electrodes used in the prior art, may be advanced by applying pressure to an end 22 of the insert 4 which is opposite the end of the insert which is initially flush with the exterior surface of the casing 10. This pressure may be applied by a tool 24 such as that depicted in FIG. 3. A handle 26 of the tool 24 is used to advance a punch 28 by threaded means through the cavity 12 so that punch 28 applies pressure to the upper end of insert 4 while casing 2 is held within the tool 24. Pressure is applied to the insert 4 by the tool 24 until all of the portion of the insert 4 in which crater 20 has formed has advanced from the casing 2. This portion of the insert 4 in which crater 20 is present is now removed so that the insert is again flush with the electrode casing. While the worn portion of the insert may be removed by any known means of metal removal, it is suggested that perhaps grinding is the easiest and most efficient way to remove the undesired portion of the insert, and to again form the insert so that it is flush with the surface of the casing.

The renewed electrode may now be reinstalled into the plasma cutting torch 8. The insert may be advanced and ground away so as to renew the electrode on a repetitive basis, until there is insufficient insert material to make such resurfacing available.

The present invention provides an electrode which should provide at least a four-fold increase in service life over those electrodes found in the prior art. This increased life expectancy is generated by means of an electrode casing which provides superior cooling for the insert, and which provides an insert which may be advanced through the casing as the electrode erodes away thorugh normal use so as to extend the usable service life of the electrode.

What is claimed is:

1. A plasma arc electrode, comprising:
    a. an electrically conductive casing having a void therein; and
    b. an insert which is retained within said void and which is flush with said casing on one end and extends out of said void in said casing and said casing on an opposite end, and which is retained within said void by frictional annular pressure and which may be advanced within said void by pushing said end which extends out of said void, so as to expose said opposite end of said electrode externally to said conductive casing so that said portion of said insert so exposed may be removed.

2. A plasma arc electrode, comprising:
    a. an electrically conductive casing having a void near a lower portion thereof which extends to an outside surface of said casing, and having a cavity which is concentric with and connecting with said void, but being of a larger diameter than said void; and
    b. an insert which is retained within said casing by frictional annular contact with said void and having one end which is flush with said outer surface of said casing and which extends into said cavity of said casing on an opposite end of said insert, and which may be advanced through said casing by applying pressure to said end of said insert which extends into said cavity, so as to expose a portion of said insert externally to said casing for removal of said portion.

3. A plasma arc electrode, comprising:
    a. an electrically conductive casing having a void therein; and
    b. an insert which is retained within said void by frictional annular pressure and which extends out of said void into a cavity on one end of said casing and which may be advanced longitudinally within said void by pushing said insert along its axis, so as to expose a portion of said electrode externally to said conductive casing so that said portion so exposed may be removed.

* * * * *